United States Patent [19]

Tamura

[11] Patent Number: 5,095,209
[45] Date of Patent: Mar. 10, 1992

[54] COMPACT RADIATION IMAGE INFORMATION READING APPARATUS HAVING ERASING CAPABILITY

[75] Inventor: Kaoru Tamura, Kanagawa, Japan

[73] Assignee: Fuji Photo Film Co., Ltd., Kanagawa, Japan

[21] Appl. No.: 630,601

[22] Filed: Dec. 20, 1990

[30] Foreign Application Priority Data

Dec. 28, 1989 [JP] Japan .................................. 1-342240

[51] Int. Cl.⁵ .............................................. G03B 42/00
[52] U.S. Cl. .................................................. 250/327.2
[58] Field of Search .......... 250/327.2, 484.1, 327.2 K, 250/327.2 J, 484.1 B

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,387,428 | 6/1983 | Ishida et al. | 364/413.13 |
| 4,754,144 | 6/1988 | Seto | 250/484.1 |
| 4,760,255 | 7/1988 | Kimura et al. | 250/327.2 |
| 4,771,174 | 9/1988 | Torii | 250/327.2 |
| 4,864,134 | 9/1989 | Hosoi et al. | 250/327.2 |
| 4,885,468 | 12/1989 | Shimura | 250/327.2 |

FOREIGN PATENT DOCUMENTS

| | | |
|---|---|---|
| 55-12429 | 1/1980 | Japan . |
| 55-116340 | 9/1980 | Japan . |
| 55-163472 | 12/1980 | Japan . |
| 56-11395 | 2/1981 | Japan ................. 250/327.2 |
| 56-104645 | 8/1981 | Japan . |
| 62-124549 | 6/1987 | Japan . |
| 2-12232 | 1/1990 | Japan ............... 250/327.2 J |

*Primary Examiner*—Constantine Hannaher
*Attorney, Agent, or Firm*—Sughrue, Mion, Zinn, Macpeak & Seas

[57] ABSTRACT

A radiation image information reading apparatus includes a reading unit for reading radiation image information recorded in a stimulable phosphor sheet, and an erasing unit for erasing residual radiation image information remaining in the stimulable phosphor sheet after the radiation image information has been read therefrom by the reading unit. A cassette in which the stimulable phosphor sheet is stored is held in a cassette holder which has a feed roller for taking the stimulable phosphor sheet into and out of the cassette. A first sheet feeder feeds the stimulable phosphor sheet from the cassette holder through the reading unit to the erasing unit, and a second sheet feeder feeds for feeding the stimulable phosphor sheet from the erasing unit to the cassette holder. The first and second sheet feeders are disposed parallel to each other. While recorded radiation image information on one stimulable phosphor sheet in the first sheet feeder is being read in the reading unit, another stimulable phosphor sheet may be fed back to the cassette holder by the second sheet feeder.

6 Claims, 2 Drawing Sheets

COMPACT RADIATION IMAGE INFORMATION READING APPARATUS HAVING ERASING CAPABILITY

BACKGROUND OF THE INVENTION

1. Field of the Invention

The present invention relates to a radiation image information reading apparatus comprising a reading unit and an erasing unit which are combined with each other, and more particularly to a radiation image information reading apparatus of such a construction which is small in size and has a high image processing capability.

2. Prior Art

There is known a stimulable phosphor which, when exposed to radiation such as X-rays, α-rays, β-rays, γ-rays, cathode rays, or ultraviolet rays, stores a part of the energy of the radiation. When the phosphor exposed to the radiation is subsequently exposed to stimulating rays such as visible light, the phosphor emits light in proportion to the stored energy of the radiation.

Various proposed radiation image information recording and reproducing systems employ sheets of stimulable phosphor. In such a system, the radiation image information of an object such as a human body is recorded in a stimulable phosphor sheet, the stimulable phosphor sheet is then scanned with stimulating rays of light to emit light representing the recorded radiation image information, and then the emitted light is photoelectrically read to produce an image signal which is subsequently processed to produce a radiation image as a visible image on a recording medium such as a photographic photosensitive medium, a CRT, or the like (see Japanese Laid-Open Patent Publication Nos. 55(1980)-12429, 56(1981)-11395, 55(1980)-163472, 56(1981)-104645, and 55(1980)-116340, for example).

In the radiation image information recording and reproducing system, the stimulable phosphor sheet serves as only an image storage medium for temporarily storing radiation image information until the recorded information will be read by stimulating light rays. After the image information is read, any residual image information remaining in the sheet should preferably be erased to make the sheet reusable.

There has been proposed a radiation image information reading apparatus having a reading unit for reading image information recorded in a stimulable phosphor sheet and an erasing unit for erasing residual image information that remains in the stimulable phosphor sheet.

In the proposed radiation image information reading apparatus, a cassette containing a stimulable phosphor sheet in which radiation image information has been stored by an external recording apparatus is loaded in a cassette holder, and the stimulable phosphor sheet is taken out of the cassette and delivered to the reading unit in which the recorded image information is read from the stimulable phosphor sheet. After the image information is read, the stimulable phosphor sheet is sent to the erasing unit where any residual image information is erased from the stimulable phosphor sheet. The stimulable phosphor sheet from which the remaining image information has been erased is then removed from the radiation image information reading apparatus, and loaded into the recording apparatus for recording image information again.

There has also been proposed a radiation image information reading apparatus in which a stimulable phosphor sheet with residual image information erased therefrom is stored in a cassette again for delivery to an external recording apparatus (see Japanese Laid-Open Patent Publication No. 62(1987)-124549).

In the proposed radiation image information reading apparatus, after recorded radiation image information has been read from a stimulable phosphor sheet and any residual image information has been erased therefrom, the stimulable phosphor sheet passes through the reading unit back into the cassette. Therefore, recorded radiation image information cannot be read from a next stimulable phosphor sheet until the previous stimulable phosphor sheet is stored back in the cassette. Consequently, the proposed radiation image information reading apparatus cannot read recorded radiation image information from stimulable phosphor sheets at high speed.

SUMMARY OF THE INVENTION

It is an object of the present invention to provide a radiation image information reading apparatus of a relatively small size which can highly efficiently read recorded radiation image information from stimulable phosphor sheets removed from cassettes, and erase residual radiation image information from the stimulable phosphor sheets.

According to the present invention, there is provided a radiation image information reading apparatus comprising a reading unit for reading radiation image information recorded in a stimulable phosphor sheet, an erasing unit for erasing residual radiation image information remaining in the stimulable phosphor sheet after the radiation image information has been read therefrom by the reading unit, a cassette holder for detachably holding a cassette in which the stimulable phosphor sheet is stored, the cassette holder having means for taking the stimulable phosphor sheet into and out of the cassette, a first sheet feeder for feeding the stimulable phosphor sheet from the cassette holder through the reading unit to the erasing unit, and a second sheet feeder disposed parallel to the first sheet feeder, for feeding the stimulable phosphor sheet from the erasing unit to the cassette holder.

The cassette holder is disposed in linear alignment with an end of the first sheet feeder. The first sheet feeder includes a portion extending between an end of the cassette holder and the reading unit, the portion having a length greater than the length of the stimulable phosphor sheet.

The first and second sheet feeders have sheet feed rollers disposed near the cassette holder, the sheet feed rollers including first, second, and third rollers, the second roller being shared by the first and third rollers for feeding the stimulable phosphor sheet in different directions. The first and second sheet feeders also have sheet feed rollers disposed near the erasing unit, the sheet feed rollers including first, second, and third rollers, the second roller being shared by the first and third rollers for feeding the stimulable phosphor sheet in different directions.

The second sheet feeder has a portion curved upwardly downstream of the reading unit with respect to a direction from the reading unit to the erasing unit, the erasing unit being disposed vertically at a position where the first and second sheet feeders terminate.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
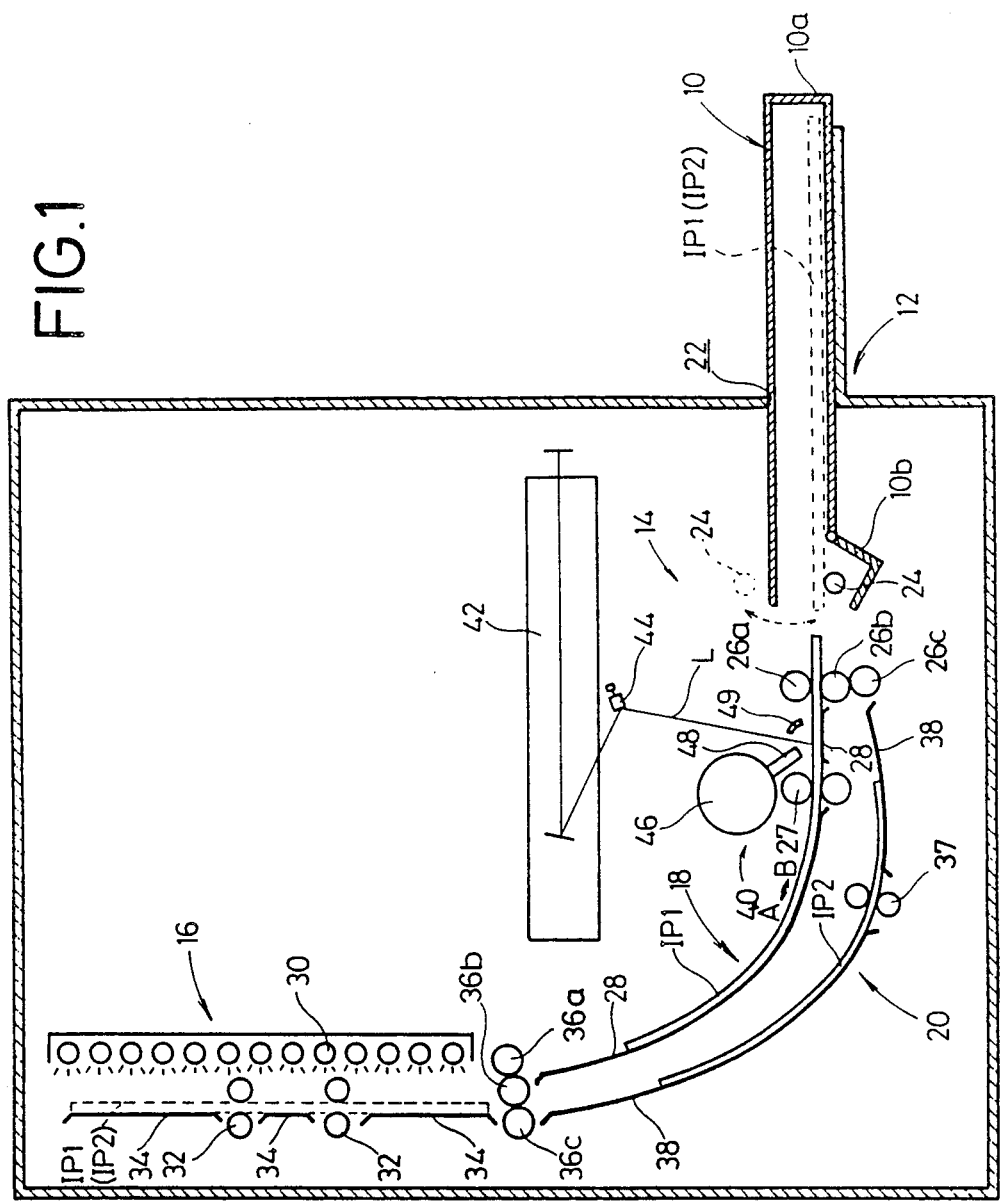
FIG. 1 is a side elevational view, partly in cross section, of a radiation image information reading apparatus according to an embodiment of the present invention.

FIG. 1 shows a radiation image information reading apparatus according to an embodiment of the present invention.

The radiation image information reading apparatus shown in FIG. 1 generally comprises, in a single housing, a cassette holder 12 for detachably holding a cassette 10 which stores a stimulable phosphor sheet, a reading unit 14 for reading radiation image information recorded in the stimulable phosphor sheet, an erasing unit 16 for erasing residual radiation image information remaining in the stimulable phosphor sheet after the recorded radiation image information has been read from the stimulable phosphor sheet in the reading unit 14, a first sheet feeder 18 for feeding the stimulable phophsor sheet taken out of the cassette 10 in the cassette holder 12 through the reading unit 14 to the erasing unit 16, and a second sheet feeder 20 for feeding the stimulable phosphor sheet from the erasing unit 16 back to the cassette holder 12.

The cassette 10 stores a single stimulable phosphor sheet, denoted at IP1 for example. The cassette 10 is of a light shielding structure for preventing the stored stimulable phosphor sheet IP1 from being exposed to extraneous light when radiation image information is recorded therein by radiation. The cassette 10 comprises a cassette case 10a for storing the stimulable phosphor sheet IP1 therein, and a lid 10b openably and closably joined to the cassette case 10a. The cassette holder 12 for holding the cassette 10 has a cassette insertion slot 22 through which the cassette 10 can be inserted into A feed roller 24 is disposed in the apparatus housing near the cassette insertion slot 22, for taking the stimulable phosphor sheet IP1 into and out of the cassette 10 in the cassette holder 12. The feed roller 24 can be dispaced between a lower solid-line position and an upper dotted-line position.

The first sheet feeder 18 has one end positioned near the feed roller 24. The end of the first sheet feeder 18 extends substantially horizontally in the reading unit 14. The opposite end of the first sheet feeder 18 extends arcuately upwardly toward the erasing unit 16. The first sheet feeder 18 has spaced pairs of nip rollers 26a, 26b, nip rollers 36a, 36b, and nip rollers 37 at the respective ends and an intermediate position therebetween, respectively, and also guide members 28 extending between these nip roller pairs.

The erasing unit 16 is connected to the curved opposite end of the first sheet feeder 18. The erasing unit 16 extends vertically and has a length corresponding to the length of the stimulable phosphor sheet IP1. The erasing unit 16 has a plurality of light sources 30 for applying erasing light to the stimulable phosphor IP1 in the erasing unit 16, vertically spaces pairs of nip rollers 32, and guide plates 34 extending between and above and below these nip roller pairs.

The second sheet feeder 20 has one end disposed near the lower end of the erasing unit 16 in the vicinity of the curved opposite end of the first sheet feeder 18. The second sheet feeder 20 extends arcuately downwardly from the lower end of the erasing unit 16, along and below the first sheet feeder 18 toward a position near the feed roller 24, and has its opposite end located adjacent to the end of the first sheet feeder 18. The second sheet feeder 20 comprises a nip roller 26c which coacts with the nip roller 26b, a nip roller 36c which coacts with the nip roller 36b, and a pair of nip rollers 37 positioned between the nip rollers 26c, 36c, and guide members 38 extending between the nip rollers 26c, 36c, 37.

The reading unit 14 includes a stimulating light source 42 such as an He-Ne laser and a light deflector 44 such as a galvanometer mirror, the stimulating light source 42 and the light detector 44 being disposed above the end of the first sheet feeder 18 near the cassette holder 12. The light deflector 44 scans the stimulable phosphor sheet IP1 in which radiation image information is recorded, with stimulating light L such as a laser beam. The reading unit 14 also includes a photoelectric reader 40 for photoelectrically reading light emitted from the stimulable phosphor sheet IP1 upon exposure to the stimulating light L, and producing electric image signal which will be processed to generate a visible image. The photoelectric reader 40 comprises an elongate photomultiplier 46 extending along a main scanning line on the stimulable phosphor sheet IP1, and a small light guide 48 mounted on the light detecting surface of the photomultiplier 46, as disclosed in Japanese Laid-Open Patent Publication No. 62(1987)-16666, corresponding to U.S. Pat. No. 4,864,134 issued Sept. 5, 1989 issued for example. The light emitted from the stimulable phosphor sheet IP1 is reflected toward the light guide 48 by a reflecting mirror 49. Use of the elongate photomultiplier 46 is effective to reduce the size of the photoelectric reader 40, and hence the size of the entire apparatus. However, the reading unit 14 may employ another known photoelectric reader which comprises a relatively small photomultiplier, and sheet-like light guide having one end extending in a main scanning direction and the other end curved into a cylindrical shape along the photomultiplier.

The radiation image information reading apparatus is basically constructed as described above. Operation of the radiation image information reading apparatus will be described below.

First, the cassette 10 with the stimulable phosphor sheet IP1 stored is inserted into the cassette insertion slot 22 so that the cassette 10 is loaded in the cassette holder 12. The lid 10b of the cassette 10 is opened by a lid opening mechanism (not shown), and the feed roller 24 is moved from the dotted-line position to the solid-line position. Then, the stimulable phosphor sheet IP1 is taken out of the cassette 10 by the feed roller 24, and fed over the guide member 28 by the nip rollers 26a, 26b of the first sheet feeder 18 until the leading end of the stimulable phosphor sheet IP1 reaches the reading unit 14.

In the reading unit 14, the stimulable phosphor sheet IP1 is fed in an auxiliary scanning direction indicated by the arrow A, and simultaneously scanned with stimulating light L in a main scanning direction which is perpendicular to the auxiliary scanning direction. More specifically, the stimulating light L emitted from the stimulating light source 42 is deflected by the light deflector 44 to scan the stimulable phosphor sheet IP1 in the main scanning direction. Therefore, one surface (upper surface) of the stimulable phosphor sheet IP1 as it is continuously fed in the auxiliary scanning direction is two-dimensionally scanned with the stimulating light L, thereby emitting light. The light emitted from the stimulable phosphor sheet IP1 is detected by the photomultiplier 46 through the light guide 48, and converted into an electric signal by the photomultiplier 46. The electric signal from the photomultiplier 46 is supplied to an image information processor (not shown) where it is processed into a visible image.

While the radiation image information recorded in the stimulable phosphor sheet IP1 at its leading end is being read in the reading unit 14, the trailing end of the stimulable phosphor sheet IP1 still remains in the cassette 10. The reading unit 14 and the cassette holder 12 are disposed linearly adjacent to each other, making the apparatus relatively small. The first and second sheet feeders 18, 20 are curved upwardly toward the erasing unit 16, which is vertically disposed This construction also makes the apparatus small in width, i.e., in the horizontal direction in FIG. 1. The cassette holder 12 is also disposed in linear alignment with the end of the first sheet feeder 18 which is close to the cassette holder 12. The nip rollers at the ends of the first and second sheet feeders 18, 20 are composed of a first group of nip rollers 26a, 36a, a second group of nip rollers 26b, 36b, and a third group of nip rollers 26c, 36c. The second group of nip rollers 26b, 36b is shared by the first and second sheet feeders 18, 20 for feeding the stimulable phosphor sheet IP1 in different directions. Therefore, the number of parts required by the first and second sheet feeders 18, 20 is relatively small, making the apparatus further small in size.

To read the radiation image information recorded in the stimulable phosphor sheet IP1, the radiation image information ma fist be roughly read in a preliminary reading mode to determine reading conditions to be used when the radiation image information is read in a main reading mode. In the preliminary reading mode, the stimulable phosphor sheet IP1 as it is fed in the direction indicated by the arrow A is scanned with stimulating light L having a lower energy level than the stimulating light L applied in the main reading mode, and the emitted light is processed to determine the reading conditions. Thereafter, the stimulable phosphor sheet IP1 is moved back in the direction indicated by the arrow B, and then fed in the direction indicated by the arrow A while being scanned with stimulating light L of a higher energy level in the main reading mode.

After the recorded radiation image information has been read from the stimulable phosphor sheet IP1 in the reading unit 14, the stimulable phosphor sheet IP1 is fed upwardly into the erasing unit 16 by the first sheet feeder 18. In the erasing unit 16, erasing light is applied from the light sources 30 to the stimuable phosphor sheet IP1 which is being held by the nip rollers 32 and the guide plates 34. When the stimulable phosphor sheet IP1 is exposed to the erasing light, it discharges the energy of any residual radiation image information that remains in the stimulable phosphor sheet IP1. Therefore, the residual radiation image information is erased from the stimulable phosphor sheet IP1.

Thereafter, the stimulable phosphor sheet IP1 from which the residual radiation image information has been erased is delivered into the second sheet feeder 20 by the nip rollers 36b, 36c and the guide member 38. The stimulable phosphor sheet IP1 is fed by the second sheet feeder 20, which extends parallel to and below the first sheet feeder 18, back into the cassette IP1.

As described above, the second sheet feeder 20, which feeds the stimulable phosphor sheet IP1 back to the cassette 10, extends parallel to the first sheet feeder 18, which feeds the stimulable phosphor sheet IP1 to the reading unit 14 and the erasing unit 16. Therefore, while the stimulable phosphor sheet IP1 in the first sheet feeder 18 is being read in the reading unit 14, another stimulable phosphor sheet IP2 from which residual radiation image information has been erased by the erasing unit 16 may be fed back to the cassette 10 by the second sheet feeder 20. Therefore, the two stimulable phosphor sheets IP1, IP2 may be simultaneously processed in different operations, i.e., reading of recorded radiation image information and erasing of residual radiation image information. As a result, a plurality of stimulable phosphor sheets can be processed highly efficiently.

Figure 2:
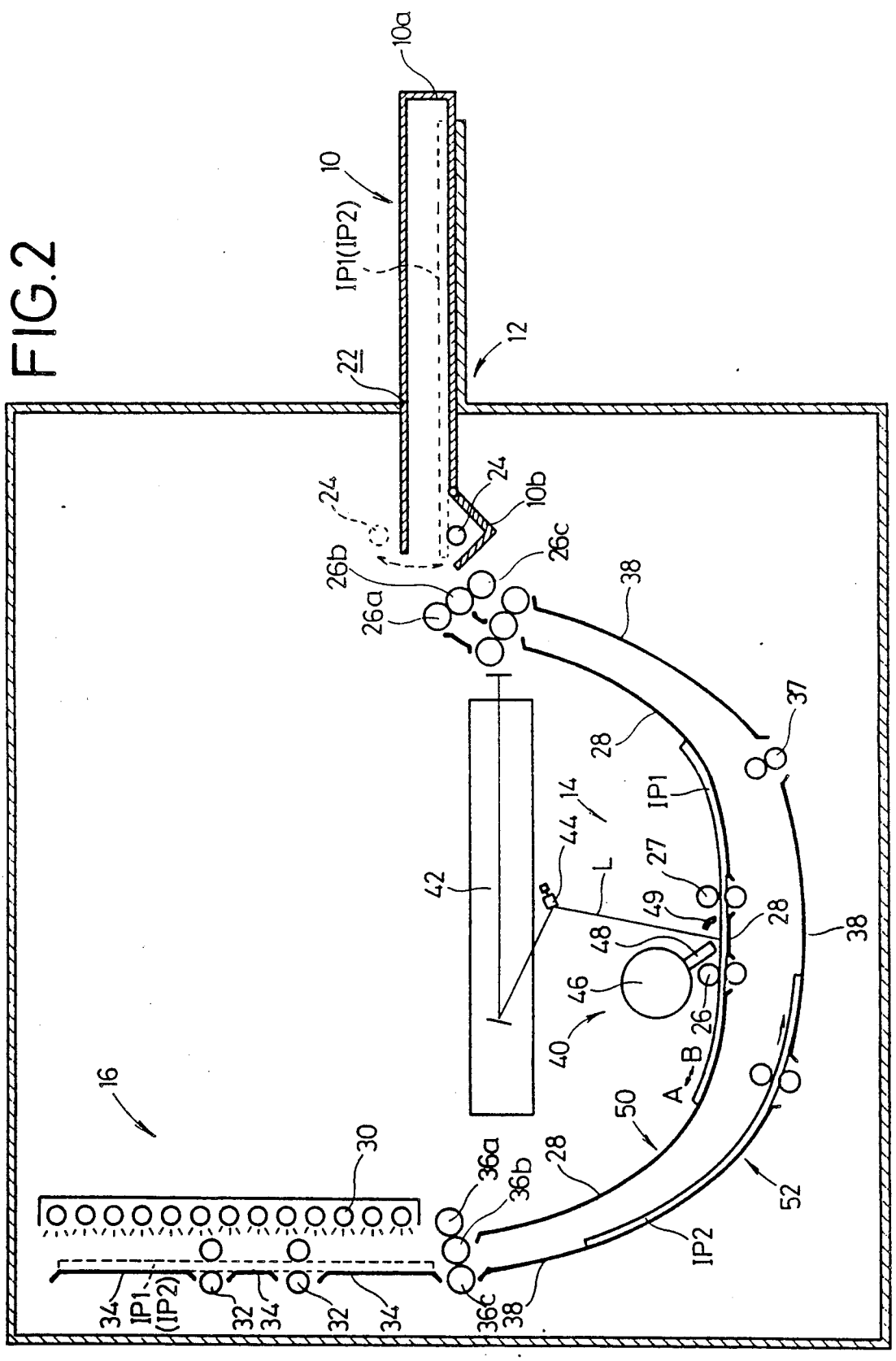
FIG. 2 is a side elevational view, partly in cross section, of a radiation image information reading apparatus according to another embodiment of the present invention.

FIG. 2 shows a radiation image information reading apparatus according to another embodiment of the present invention. Those parts shown in FIG. 2 which are identical to those shown in FIG. 1 are denoted by identical reference numerals, and will not be described in detail. In the embodiment shown in FIG. 2, the radiation image information reading apparatus has first and second sheet feeders 50, 52 whose opposite ends are arcuately curved upwardly symmetrically with respect to the reading unit 14 on opposite sides thereof. The first and second sheet feeders 50, 52 thus constructed have a feed path extending from the inner end of the cassette holder 12 to the reading unit 14, the feed path being longer than the stimulable phosphor sheet IP1, IP2. With this arrangement, when the stimulable phosphor sheet IP1 is fed to reach the reading unit 14 by the first sheet feeder 50, the other stimulable phosphor sheet 52 can immediately be stored in the cassette 10 by the second sheet feeder 52. Therefore, the radiation image information reading apparatus shown in FIG. 2 can process stimulable phosphor sheets more efficiently.

With the present invention, the first sheet feeder for feeding the stimulable phosphor sheet from the cassette holder through the reading unit to the erasing unit and the second sheet feeder for feeding the stimulable phosphor sheet from the erasing unit back to the cassette holder are disposed parallel to each other. Therefore, while recorded radiation image information on one stimulable phosphor sheet in the first sheet feeder is being read in the reading unit, another stimulable phosphor sheet may be fed back to the cassette holder by the second sheet feeder. Consequently, the radiation image information reading apparatus according to the present invention can process a plurality of stimulable phosphor sheets highly efficiently. The radiation image information reading apparatus is relatively small in size because the first and second sheet feeders are disposed parallel to each other.

Although certain preferred embodiments have been shown and described, it should be understood that many changes and modifications may be made therein without departing from the scope of the appended claims.

What is claimed is:

1. A radiation image reading apparatus comprising:
   a reading unit for reading radiation image information recorded in a stimulable phosphor sheet;
   an erasing unit for erasing residual radiation image information remaining in the stimulable phosphor sheet after the radiation image information has been read therefrom;
   a cassette holder for detachably holding a cassette in which the stimulable phosphor sheet is stored, said cassette holder having means for taking the stimulable phosphor sheet into and out of the cassette;
   a first sheet feeder for feeding the stimulable phosphor sheet from said cassette holder through said reading unit to said erasing unit; and
   a second sheet feeder disposed parallel to said first sheet feeder, for feeding the stimulable phosphor sheet from said erasing unit, bypassing said reading unit, to said cassette holder;
   wherein said erasing unit is disposed at a position where said first and second sheet feeders terminate, said first sheet feeder feeding the stimulable phosphor sheet into said erasing unit at said position, said second sheet feeder retrieving the erased stimulable phosphor sheet from said erasing unit at said position and feeding the erased stimulable phosphor sheet to said cassette holder.

2. A radiation image information reading apparatus according to claim 1, wherein said cassette holder is disposed in linear alignment with ann end of said first sheet feeder.

3. A radiation image information reading apparatus according to claim 1, wherein said first sheet feeder includes a portion extending between an end of said cassette holder and said reading unit, said portion having a length greater than the length of said stimulable phosphor sheet.

4. A radiation image information reading apparatus according to claim 1, wherein said first and second sheet feeders have sheet feed rollers disposed near said cassette holder, said sheet feed rollers including first, second, and third rollers, said second roller being shared by said first and third rollers for feeding the stimulable phosphor sheet in different directions.

5. A radiation image information reading apparatus according to claim 1, wherein said first and second sheet feeders have sheet feed rollers disposed near said erasing unit, said sheet feed rollers including first, second, and third rollers, said second roller being shared by said first and third rollers for feeding the stimulable phosphor sheet in different directions.

6. A radiation image information reading apparatus according to claim 1, wherein said second sheet feeder has a portion curved upwardly downstream of said reading unit with respect to a direction from said reading unit to said erasing unit, said erasing unit being disposed vertically.

* * * * *